US008830966B2

(12) United States Patent
Kalfon et al.

(10) Patent No.: US 8,830,966 B2
(45) Date of Patent: Sep. 9, 2014

(54) DISCONTINUOUS TRANSMISSION IN A FRAME

(75) Inventors: Shai Kalfon, Hod Hasharon (IL); Ido Gazit, Haifa (IL)

(73) Assignee: LSI Corporation, San Jose, CA (US)

( * ) Notice: Subject to any disclaimer, the term of this patent is extended or adjusted under 35 U.S.C. 154(b) by 263 days.

(21) Appl. No.: 13/187,640

(22) Filed: Jul. 21, 2011

(65) Prior Publication Data

US 2013/0022027 A1    Jan. 24, 2013

(51) Int. Cl.
    H04B 7/216    (2006.01)
    H04B 7/24     (2006.01)
    H04W 52/02    (2009.01)

(52) U.S. Cl.
    CPC ............. *H04B 7/24* (2013.01); *H04W 52/0216* (2013.01)
    USPC ......................................................... 370/335

(58) Field of Classification Search
    CPC .......................................................... H04B 7/24
    USPC .......................... 370/311, 317–322, 335, 352; 714/748–749
    See application file for complete search history.

(56) References Cited

U.S. PATENT DOCUMENTS

| | | | |
|---|---|---|---|
| 5,953,666 A | 9/1999 | Lehtimaki | 455/439 |
| 6,542,538 B2 | 4/2003 | Fischel et al. | 375/224 |
| 6,556,550 B1 | 4/2003 | Rasanen | 370/329 |
| 6,868,075 B1 | 3/2005 | Narvinger et al. | 370/335 |
| 7,050,439 B1 | 5/2006 | Kaaresoja | 370/395.1 |
| 7,352,722 B2 | 4/2008 | Malladi et al. | 370/335 |
| 2003/0086381 A1* | 5/2003 | Terry et al. | 370/280 |
| 2007/0280171 A1* | 12/2007 | Carmon et al. | 370/335 |
| 2008/0151854 A1* | 6/2008 | Mantha et al. | 370/342 |
| 2009/0310540 A1* | 12/2009 | Barany et al. | 370/328 |
| 2010/0260121 A1* | 10/2010 | Gholmieh et al. | 370/329 |
| 2012/0082192 A1* | 4/2012 | Pelletier et al. | 375/219 |
| 2013/0225227 A1* | 8/2013 | Ericson et al. | 455/522 |

OTHER PUBLICATIONS

3GPP TS 25.212, "3rd Generation Partnership Project;Technical Specification Group Radio Access Network; Multiplexing and channel coding (FDD)", (Release 10), V10.1.0, (Dec. 2010).*

* cited by examiner

*Primary Examiner* — Andrew Chriss
*Assistant Examiner* — Peter Mak
(74) *Attorney, Agent, or Firm* — Christopher P. Maiorana, PC

(57) ABSTRACT

An apparatus having a database and a circuit is disclosed. The database may be configured to store a plurality of entries. The circuit may be configured to (i) insert a plurality of indicators into a frame, (ii) generate the entries in the database and (iii) transmit the frame in response to the entries such that power is applied to an antenna corresponding to each of a plurality of data items in the frame and no power is applied to the antenna corresponding to each of the indicators in the frame. Each of the entries generally identifies a respective location in the frame. Each of the locations may begin a respective string comprising at least one of the indicators.

18 Claims, 9 Drawing Sheets

DISCONTINUOUS TRANSMISSION IN A FRAME

FIELD OF THE INVENTION

The present invention relates to wireless communication generally and, more particularly, to a method and/or apparatus for implementing a discontinuous transmission in a frame.

BACKGROUND OF THE INVENTION

Referring to FIG. 1, a flow diagram of a conventional transport channel multiplexing process 20 is shown. The processes 20 is used to transmit a radio frame in a downlink of a 3rd Generation Partnership Project system. The system specifies binary data bits and indication bits for a discontinuous transmission (i.e., DTX) state. The indication bits with the DTX state are used to fill non-data portions of the radio frame. Insertion points of the DTX indication bits (i.e., 1st Insertion of DTX Indication block and 2nd Insertion of DTX Indication block) depend on modes of the transport channels used in the radio frame. The system decides which modes are used during a connection.

In practice, adding the DTX indication bits to the radio frame means switching from working with one-bit symbols to working with two-or-more-bit symbols. The larger symbols are used to distinguish the DTX indication bits from the data bits. Working with greater than one-bit symbols effects a processing power used by the transport channel. Where no DTX indication bits are present in a radio frame, all of the processing power can work on only data bits. Furthermore, the data bits can be saved in a packed way (i.e., eight data bits packed into a byte) and can be handled in parallel. Where the DTX indication bits are added to the radio frame, the data bits and the DTX indication bits are distinguished by representing each with multiple bits.

Conventional approaches distinguish the data bits from the DTX indication bits by saving each data bit in either a 2-bit symbol or an 8-bit symbol. The conventional approaches cause degradation in the processing power due to the extra bits. By representing each data bit with an N-bit symbol, the transport channel works on N times as many bits to support three states. An example of conventional 2-bit symbols approach is illustrated in Table I as follows:

TABLE I

| Bits | Symbols with DTX |
|------|------------------|
| 0    | 00               |
| 1    | 01               |
| DTX  | 10               |

It would be desirable to implement discontinuous transmission in a frame comprising single-bit symbols.

SUMMARY OF THE INVENTION

The present invention concerns an apparatus having a database and a circuit. The database may be configured to store a plurality of entries. The circuit may be configured to (i) insert a plurality of indicators into a frame, (ii) generate the entries in the database and (iii) transmit the frame in response to the entries such that power is applied to an antenna corresponding to each of a plurality of data items in the frame and no power is applied to the antenna corresponding to each of the indicators in the frame. Each of the entries generally identifies a respective location in the frame. Each of the locations may begin a respective string comprising at least one of the indicators.

The objects, features and advantages of the present invention include providing discontinuous transmission in a frame that may (i) reduce processing power, (ii) avoid switching data bits from single-bit representations to multi-bit representations, (iii) use don't-care values for discontinuous transmission indicators (iv) save locations of the discontinuous transmission indicators external to a frame and/or (v) implement single-bit discontinuous transmission indicators.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 2:
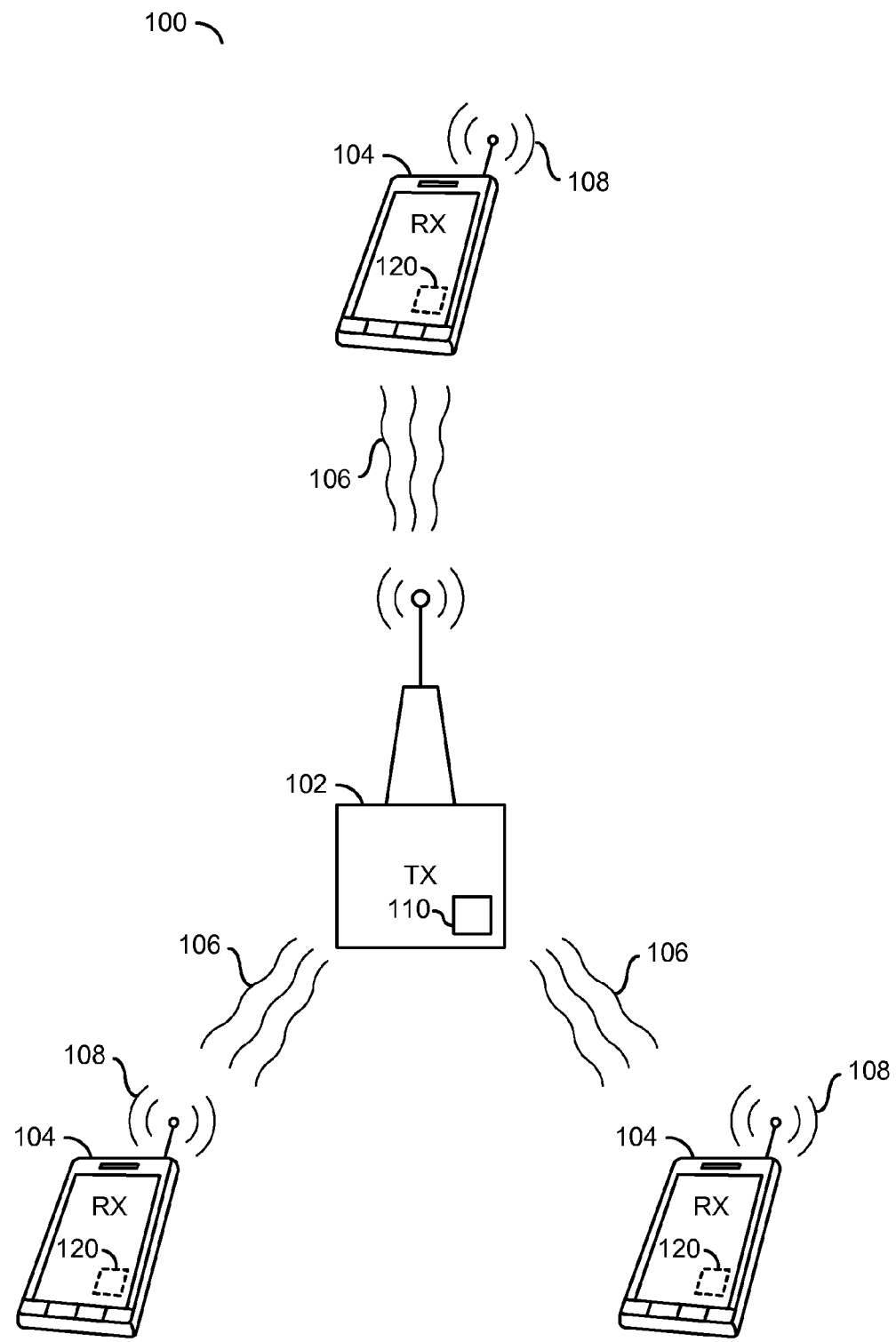
FIG. 2 is a diagram illustrating a communications system implemented in accordance with an example embodiment of the present invention.

Referring to FIG. 2, a diagram of a system 100 is shown illustrating a communications system implemented in accordance with an example embodiment of the present invention. The system 100 may implement a wireless communications system. In an example, the system 100 may implement a third generation cellular communication system compliant with the 3GPP Multiplexing and Channel Coding specification (3GPP TS 25.212, version 10.1.0, December 2010). The system 100 generally comprises at least one base station 102 and a number of mobile units (or devices) 104. The base station 102 may transmit signals to the mobile units 104 via a downlink channel 106. Each of the mobile units 104 may transmit signals to the base stations 102 via an uplink channel 108. The system 100 may also be implemented with multiple base stations 102. The base station(s) 102 may include a processing unit 110. Each of the mobile units 104 may include a processing unit 120. The processing units 110 and 120 may be configured to manage communications between the base station(s) 102 and the mobile units 104.

The processing unit 110 may be configured to perform a downlink process for multiplexing and channel coding in a frequency division duplex mode of operation. In an example, the processor 110 may implement hardware to perform the downlink processing in accordance with the present invention. In another example, the downlink processing in accordance with the present invention may be performed by software executed on the processing unit 110. In an example, the software for performing the downlink processing in accordance with the present invention may be written to a Flash memory or other nonvolatile memory (e.g., programmable read-only memory (PROM), erasable programmable read-only memory (EPROM), electrically erasable programmable read-only memory (EEPROM), bubble memory, disk or disc media, etc.). Additionally, even volatile memory, such as dynamic random access memory (e.g., DRAM) or static random access memory (e.g., SRAM), may be used. For example, the software may be loaded from a nonvolatile storage medium at power-up.

Figure 3:
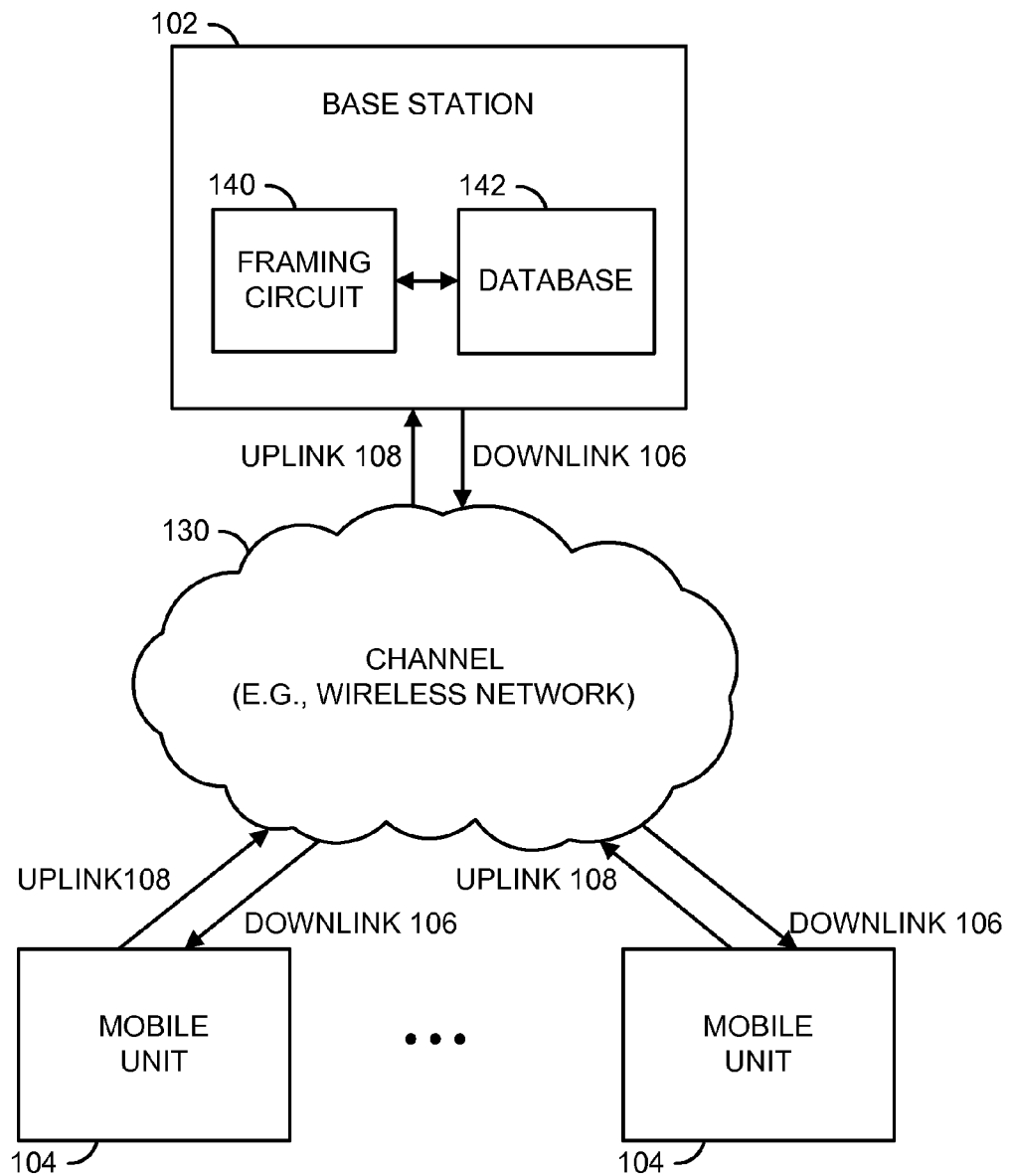
FIG. 3 is a diagram illustrating example components that may be employed by a base station in processing a downlink signal of the system.

Referring to FIG. 3, a diagram is shown illustrating example components that may be employed by the base station 102 in processing a downlink signal 106 of the system 100. In general, the base station 102 may generate the downlink signal 106 that may be used, in an example, by mobile units 104. A channel 130 may be implemented, for example, as a wireless communications channel. In an example, the channel 130 may be implemented as a cellular communications channel of a wireless communications network (e.g., a 3GPP radio access network, a 3GPP LTE network, etc.). In an example, the base station 102 may include a framing block (or circuit) 140 and a database 142. The framing circuit 140 may be implemented with the processor 110 of FIG. 2.

Figure 4:
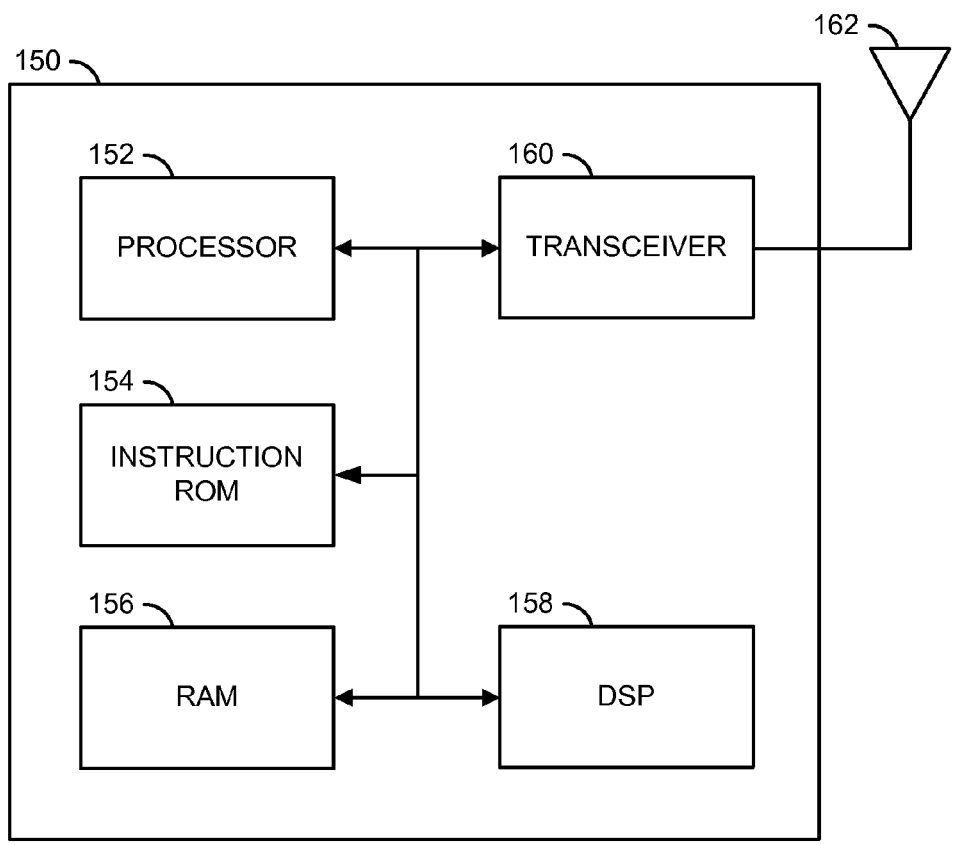
FIG. 4 is a block diagram illustrating an example processing unit that may be configured to implement channel coding in accordance with a preferred embodiment of the present invention.

Referring to FIG. 4, a block diagram is shown illustrating an example processing unit 150 that may be configured to implement channel coding in accordance with a preferred embodiment of the present invention. In an example, the processing unit 110 of FIG. 2 may be implemented using the processing unit 150. The processing unit 150 may include, but is not limited to, a block (or circuit) 152, a block (or circuit) 154, a block (or circuit) 156, a block (or circuit) 158, a block (or circuit) 160 and a block (or circuit) 162. The circuits 152-162 may represent modules and/or blocks that may be implemented as hardware, software, a combination of hardware and software, or other implementations.

The circuit 152 may be implemented, in an example, as an embedded processor (e.g., ARM, etc.). The circuit 154 may be implemented as a read-only memory (e.g., ROM). The circuit 156 may comprise random access memory (e.g., RAM). The circuit 158 may implement a digital signal processor (e.g., DSP). The circuit 160 may be implemented, in an example, as an analog/RF unit (e.g., a transceiver). In another example, the circuit 160 may implement a transmitter and a receiver that are separate. The circuit 162 may implement an antenna (e.g., a cellular antenna, etc.). The circuit 160 may be configured to transmit and receive information via the antenna 162. The circuits 152-160 may be connected together using one or more busses. In an example, the circuit 154 may store computer executable instructions for controlling the circuit 152 and/or the circuit 158 in accordance with the teachings presented herein.

In a downlink of a wideband code division multiple access (e.g., WCDMA) system, discontinuous transmission indicators (e.g., DTX) may be implemented in addition to binary data items (e.g., data bits or data symbols). The DTX indicators (or symbols) are generally used to fill unused portions of a radio frame with bits. The insertion points of the DTX indicators typically depends on whether fixed positions per a fixed mode and/or flexible positions per a flexible mode are used for one or more transport (or traffic) channels (e.g., TrCHs) in the radio frame. Insertion of the DTX indicators is generally described in the 3GPP technical specification 25.212, section 4.2 "General Coding/Multiplexing of TrCHs", which is hereby incorporated by reference.

A universal terrestrial radio access network (e.g., UTRAN) generally decides for each coded composite transport channel (e.g., CCTrCH) whether the fixed positions or the flexible positions are used during a connection. The DTX indication bits may indicate when the transmission should be turned off. The DTX indication bits are generally not transmitted on the antenna 162. Some embodiments of the present invention may reduce a width of the DTX indication bits and the data items in way that may lower a processing power used in preparing the transport channels. Some embodiments may implement the TrCH without the insertion of the DTX indicators, thereby reducing the processing power and the switching from 1 bit to a byte or 2 bits.

Figure 1:
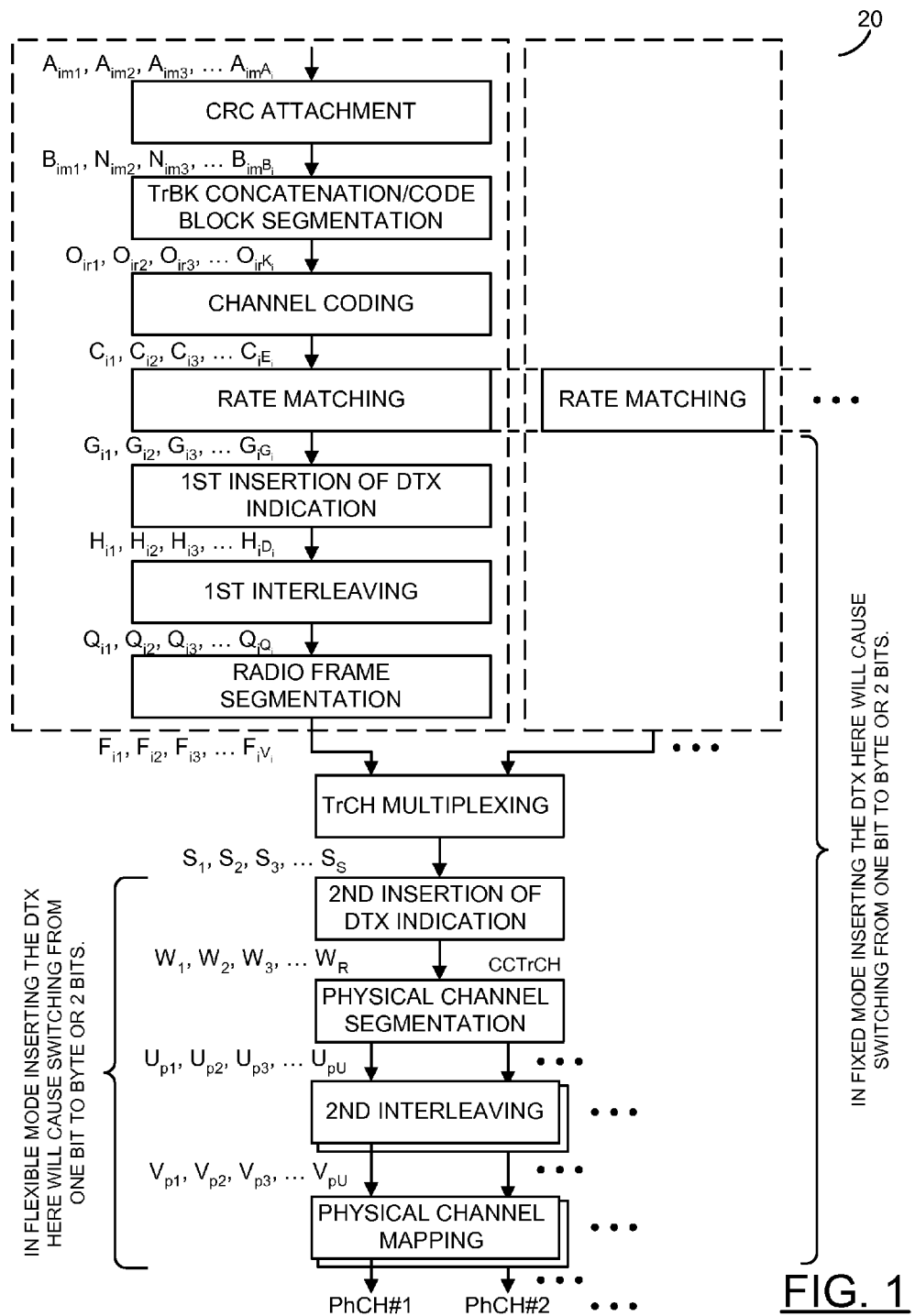
FIG. 1 is a flow diagram of a conventional transport channel multiplexing process.

For both the fixed position mode and the flexible position mode, instead of inserting multi-bit wide DTX indication bits in accordance with the specification, single-bit DTX indicators may be "inserted" at the 1st Insertion of DTX Indication block and/or the 2nd Insertion of DTX Indication block (see FIG. 1). The single-bit DTX indicators may have don't-care values (e.g., binary 0 or binary 1). Therefore, no actual insertion of the DTX indicators may be performed in some embodiments. To distinguish the DTX indicators from the data items, a set of entries may be stored in the database 142. For the flexible position mode, several (e.g., 30) entries may be stored. For the fixed position mode, several (e.g., 180) entries may be stored. The maximum number of entries is generally determined by a maximum of 6 transport channels per user and so a maximum of 6 DTX indicators insertions may exist. The subsequent interleave generally has 30 columns and thus 6×30=180 entries (or less) may exist the database 142. The entries may also enable the transport channel to keep the data items at one-bit wide.

Each entry generally provides an indication about the location of a DTX indicator in the frame at the end of the transport channel processing. Each entry generally has multiple (e.g., 2) values. A start value (e.g., DB_StartIndex) may indicate where a respective string of one or more DTX indicators starts in the frame. A size value (DB_NumOfDTX) generally indicates a number of bits (e.g., number of one-bit DTX indicators) in a respective string. The entries may be calculated in different ways for the flexible mode and the fixed mode.

The database 142 generally holds the locations (or places) where the DTX indicators start and where the DTX indicators end. Instead of inserting the multi-bit DTX symbols, the single-bit DTX indicators may be inserted as regular bits with a logical one value, or a logical zero value. Therefore, each data items may remain represented by a single bit. The data items may be interleaved with the DTX indicators by performing the whole transport channel flow, as shown in FIG. 1. Thereafter, the resulting frame may be transferred to the transceiver 160 along with the entries from the database 142 that locate the DTX indicators.

The entries in the database 142 for the fixed mode may be built as follows:

kk—may denote a transport channel number (e.g., kk=1,2)

X(kk)—may denote the number of bits in the transport channel kk.

TrCHDTX(kk)—may denote the number of DTX indicators (indication bits) in the transport channel kk.

G(kk)—may denote the number of bits in a radio frame of the transport channel kk.

DTX(kk)—may denote the number of DTX indicators added in a radio frame of the transport channel kk.

C1(kk)—may denote the number of columns from Table II as determined by the transmission time interval (see 3GPP 25.212, section 4.2.5.2 "1st Interleaver Operation", Table 4).

P1c1(j)—may denote an original column position of the j-th permuted column, see the inter-column permutation patterns for an initial (e.g., 1st) interleave operation in Table II.

P2(j)—may denote an original column position of the j-th permuted column, see the inter-column permutation patterns for a subsequent (e.g., 2nd) interleave operation in Table III (3GPP 25.212, section 4.2.11, "2nd Interleaving", Table 7).

NumOfTrCHs—may denote the number of transport channels in a single radio frame.

mS—may denote milliseconds.

TABLE II

| TTI | Number of columns C1 | Inter-column permutation patterns <P1c1(0), P11c(1), . . . , P1c1(C1-1)> |
|---|---|---|
| 10 mS | 1 | <0> |
| 20 mS | 2 | <0, 1> |
| 40 mS | 4 | <0, 2, 1, 3> |
| 80 mS | 8 | <0, 4, 2, 6, 1, 5, 3, 7> |

TABLE III

| Number of columns C2 | Inter-column permutation patterns <P2(0), P2(1), . . . , P2(C2-1)> |
|---|---|
| 30 | <0, 20, 10, 5, 15, 25, 3, 13, 23, 8, 18, 28, 1, 11, 21, 6, 16, 26, 4, 14, 24, 19, 9, 29, 12, 2, 7, 22, 27, 17> |

The following notation may be used to describe the database 142:

DB_NumOfDTXTrCH(kk,ii)—may denote the number of DTX indicators in column ii of the transport channel kk after the initial interleave. Each column generally represents a radio frame.

DB_StartIndexTrCH(kk,ii)—may denote the index of the start row of the DTX indicators in column ii of the transport channel kk after the initial interleave. Each column generally represents a radio frame.

DB_NumOfDTX(kk,ii)—may denote the number of DTX indicators in column ii of the transport channel kk after the subsequent interleave in a radio frame.

DB_StartIndex(kk,ii)—may denote an index of the start row of the DTX indicators in column ii of the transport channel kk after the subsequent interleave in a radio frame.

Figure 5:
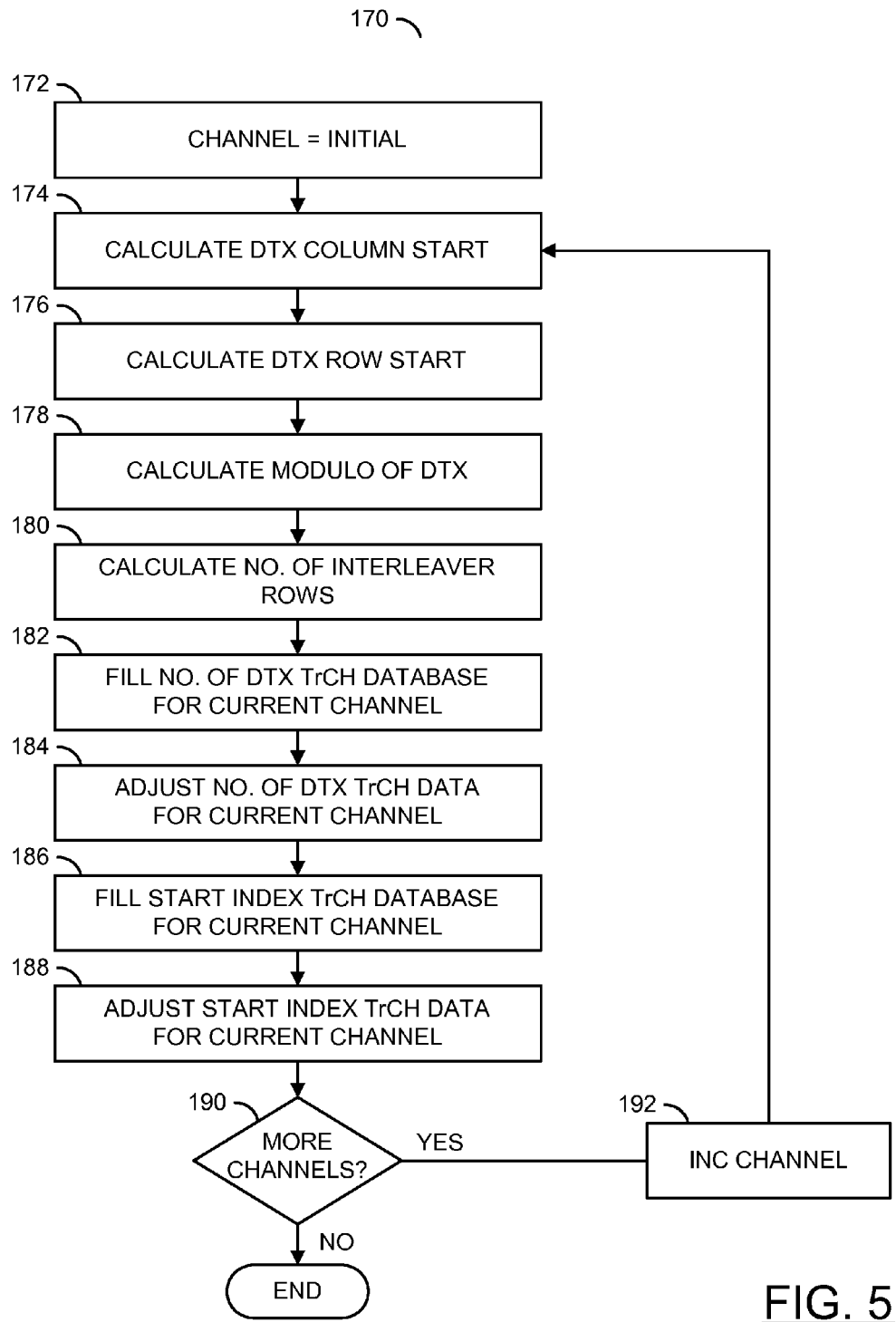
FIG. 5 is a flow diagram of an example method for adjusting a database for an initial interleave in the fixed mode.

Referring to FIG. 5, a flow diagram of an example method 170 for adjusting the database 142 for the initial interleave in the fixed mode is shown. The method (or process) 170 may be implemented by a combination of the circuit 140 and the database 142. The method 170 generally comprises a step (or state) 172, a step (or state) 174, a step (or state) 176, a step (or state) 178, a step (or state) 180, a step (or state) 182, a step (or state) 184, a step (or state) 186, a step (or state) 188, a step (or state) 190 and a step (or state) 192. The steps 172-192 may represent modules and/or blocks that may be implemented as hardware, software, a combination of hardware and software, or other implementations.

In the step 172, the transport channel information may be set to initial values. The number of transport channels (e.g., NumOfTrCHs) may be initialized to a predetermined value (e.g., 2). The values C1(1) and C1(2) may be initialized to predetermined values (e.g., 4 and 8). The pattern P1c1(1,:) may be set to a predetermined pattern (e.g., [0, 2, 1, 3]). The pattern P1c1(2,:) may be set to another predetermined pattern (e.g., [0, 4, 2, 6, 1, 5, 3, 7]).

In the step 174, the circuit 140 may calculate a DTX column start value (e.g., DTXColumnStart) as a ceiling of X(kk)/C1(kk) for the transport channel kk. The circuit 140 may calculate a DTX row start value (e.g., DTXRowStart) as a modulo operation mod(X(kk),C1(kk)) in the step 176. A modulo (or remainder) of DTX value (e.g., ModOfDTX) may be calculated in the step 178 as a modulo operation mod (TrCHDTX(kk),C1(kk)). In the step 180, a number of interleaver rows value (e.g., NumOfInterleaverRows) may be calculated as a floor of TrCHDTX(kk)/C1(kk).

In the step 182, database information of the number of DTX indicators in column ii of the transport channel kk (e.g., DB_NumOfDTXTrCH(kk,ii)) may be filled with the value NumOfInterleaverRows. The values DB_NumOfDTXTrCH in the database may be adjusted by the circuit 140 in the step 184 to account for the initial interleave. The adjustment may be performed according to equation 1 as follows:

$$DB\_NumOfDTXTrCH(kk,P1c1(kk,ii+\text{DTXRowStart}+1)+1) = DB\_NumOfDTXTrCH(kk,P1c1(kk,ii+\text{DTXRowStart}+1)+1)1, \text{ for each } ii \text{ from 0 to ModOfDTX}-1. \quad (1)$$

In the step 186, database information of the index of the start row of the DTX indicators in column ii of the transport channel kk (e.g., DB_StartIndexTrCH(kk,ii)) may be filled with the value DTXColumnStart. The values DB_StartIndexTrCH in the database may be adjusted by the circuit 140 in the step 188 to account for the subsequent interleave. The adjustment may be performed according to equation 2 as follows:

$$DB\_StartIndexTrCH(kk,P1c1(kk,ii+1)+1) = \text{DTXColumnStart}-1, \text{ for } ii \text{ from 0 to DTXRowStart}-1. \quad (2)$$

In the step 190, the circuit 140 may check to see if more transport channels remain. If more transport channels are available, the circuit 140 may increment the current value kk up to the value NumOfTrCHs in the step 192 and continue with the step 174. The loop around steps 174 to 192 may continue until all of the transport channels have been processed. Thereafter, the method 170 may end.

Figure 6:
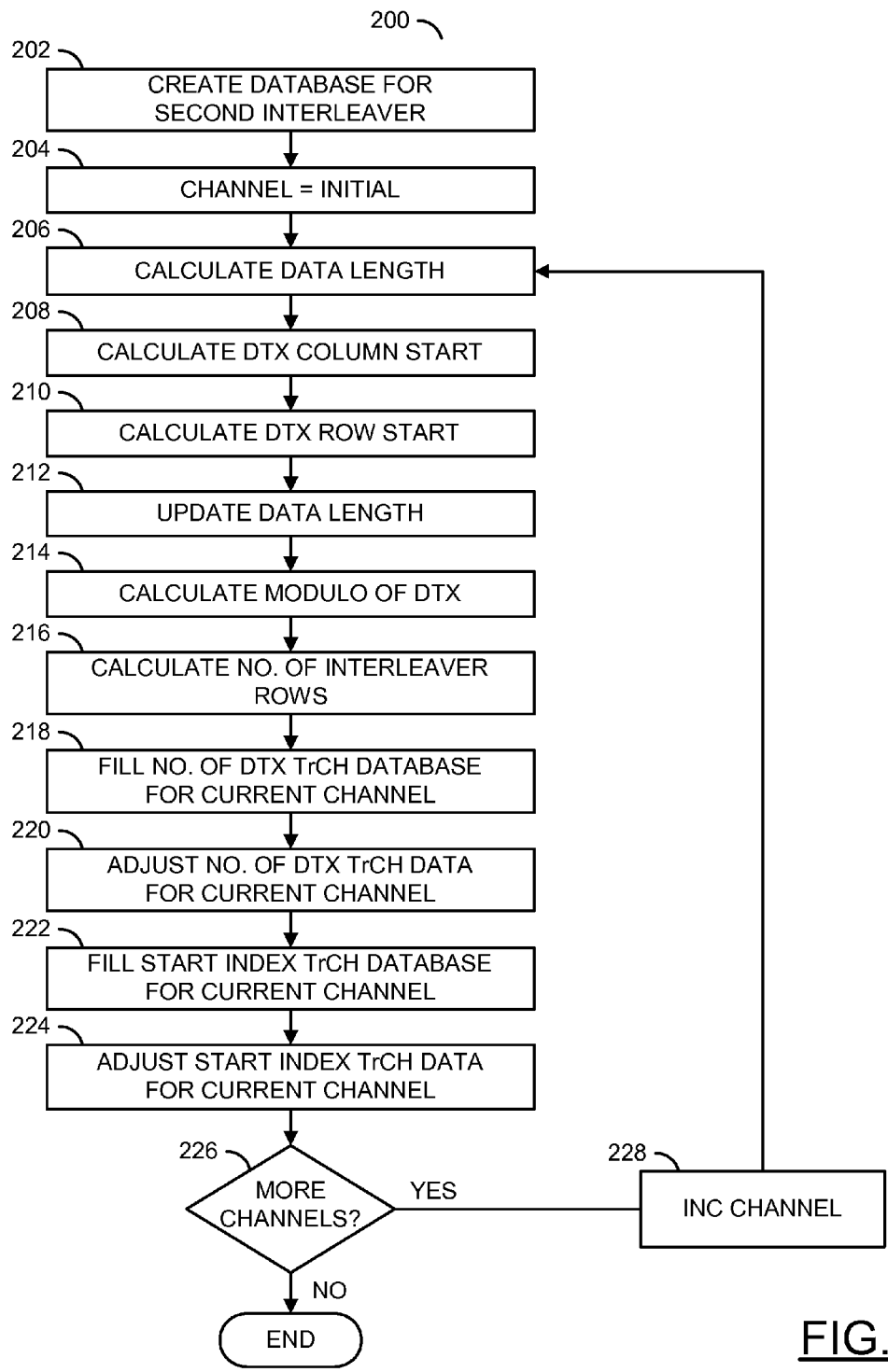
FIG. 6 is a flow diagram of an example method for adjusting the database for a subsequent interleave in the fixed mode.

Referring to FIG. 6, a flow diagram of an example method 200 for adjusting the database 142 for the subsequent interleave in the fixed mode is shown. The method (or process) 200 may be implemented by a combination of the circuit 140 and the database 142. The method 200 generally comprises a step (or state) 202, a step (or state) 204, a step (or state) 206, a step (or state) 208, a step (or state) 210, a step (or state) 212, a step (or state) 214, a step (or state) 216, a step (or state) 218, a step (or state) 220, a step (or state) 222, a step (or state) 224, a step (or state) 226 and a step (or state) 228. The steps 202-228 may represent modules and/or blocks that may be implemented as hardware, software, a combination of hardware and software, or other implementations.

In the step 202, the circuit 140 may create a database for the subsequent interleave. A transport channel column index value (e.g., ColumnIndex(kk)) may be set to a predetermined value (e.g., 1). The number of bits in a radio frame of the transport channel kk (e.g., G(kk)) may be set to DB_StartIndexTrCH(kk,ColumnIndex(kk)) for each of the transport channels. The number of DTX indicators in a radio frame of the transport channel kk (e.g., DTX(kk)) may be set to DB_NumOfDTXTrCH(kk,ColumnIndex(kk)) for each of the transport channels. Different transport channels may have different transport channel column index values (e.g., ColumnIndex(kk)—where kk is the number of the transport channel). In the step 204, the circuit 140 may set the pattern P2 to a fixed pattern (e.g., [0, 20, 10, 5, 15, 25, 3, 13, 23, 8, 18, 28, 1, 11, 21, 6, 16, 26, 4, 14, 24, 19, 9, 29, 12, 2, 7, 22, 27, 17]). A data length value (e.g., DataLen) may be set to an initial value (e.g., 0) in the step 204.

In the step 206, the value DataLen may be updated by adding the value G(kk). The value DTXColumnStart may be calculated as a ceiling of DataLen/30 in the step 208. The value DTXRowStart is generally calculated in the step 210 as a modulo operation mod(DataLen,30). In the step 212, the value DataLen may by updated by adding the value DTX(kk). The value ModOfDTX may be calculated in the step 214 as a modulo operation mod(DTX(kk),30). In the step 216 the value NumOfInterleaverRows may be calculated as a floor of DTX(kk)/30.

The values DB_NumOfDTX(kk,P2(ii+1)+1) may be filled with the value NumOfInterleaverRows in the step 218 for each ii from 0 to 29 (e.g., a value for each of the 30 columns of the subsequent interleave). In the step 220, the values DB_NumOfDTX in the database may be adjusted to account for the subsequent interleave. The adjustment may be performed according to equation 3 as follows:

$$DB\_NumOfDTX(kk,P2(ii+DTXRowStart+1)+1)\\=DB\_NumOfDTX(kk,P2(ii+DTXRowStart+1)+1)+1, \text{ for } ii \text{ from 0 to ModOfDTX}-1. \quad (3)$$

In the step 222, the values DB_StartIndex(kk,P2(ii+1)+1) may be filled with the value DTXColumnStart for each ii from 0 to DTXRowStart−1. In the step 224, the values DB_StartIndex may be adjusted by the circuit 140 to account for the subsequent interleave. The adjustment may be performed according to equation 4 as follows:

$$DB\_StartIndex(kk,P2(ii+1)+1)=DTXColumnStart, \text{ for } ii \text{ from DTXRowStart to 29.} \quad (4)$$

In the step 226, the circuit 140 may check to see if more transport channels remain. If more transport channels are available, the circuit 140 may increment the transport channel value kk up to the value NumOfTrCHs in the step 228 and continue with the step 206. The loop around steps 206 to 228 may continue until all of the transport channels have been processed. Thereafter, the method 200 may end.

Figure 7:
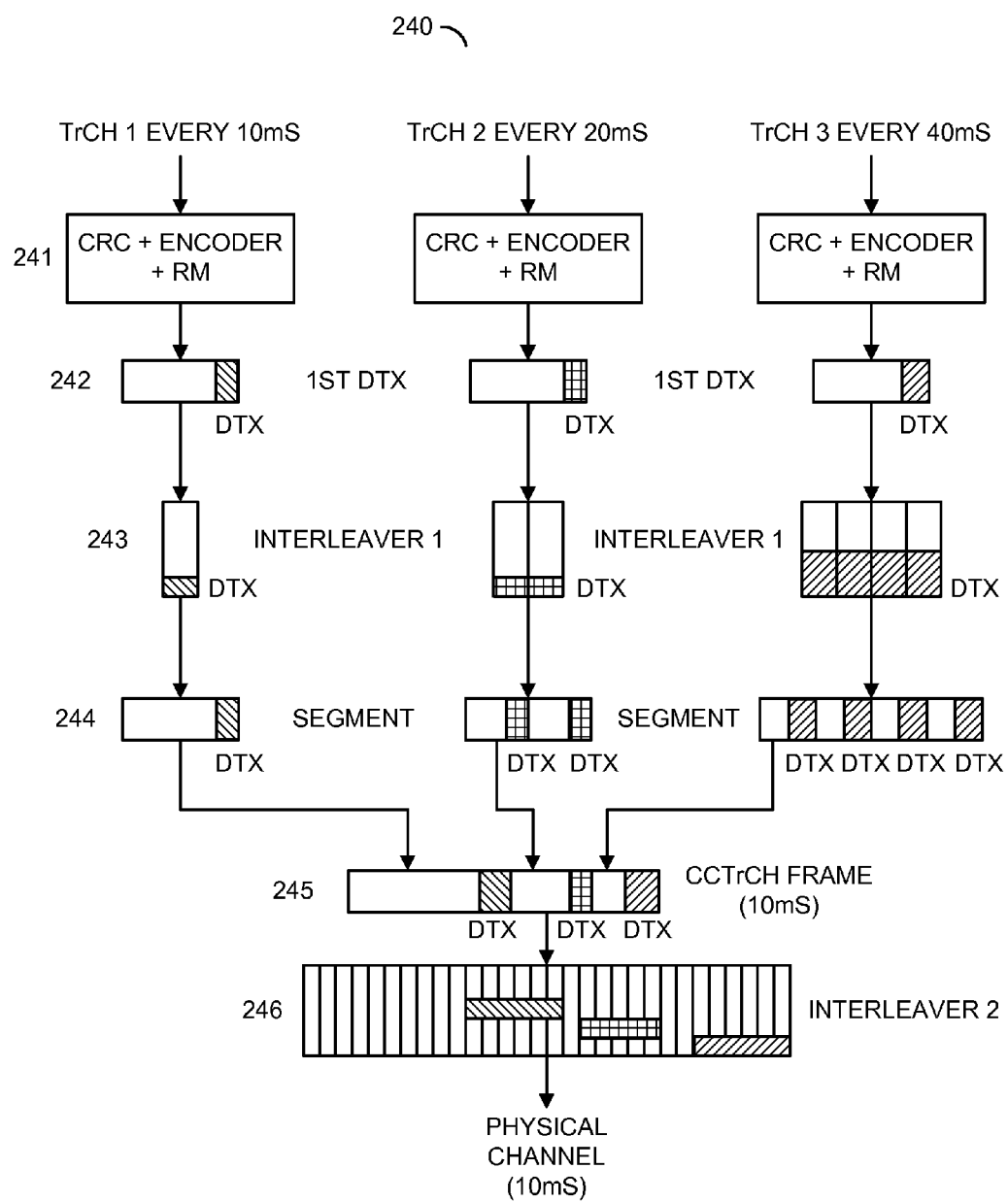
FIG. 7 is a diagram of an example method for multiplexing three transport channels in the fixed mode.

Referring to FIG. 7, a diagram of an example method 240 for multiplexing three transport channels in the fixed mode is shown. The method (or process) 240 may be implemented by a combination of the circuit 140 and the database 142. The method 240 generally comprises a step (or state) 241, a step (or state) 242, a step (or state) 243, a step (or state) 244, a step (or state) 245 and a step (or state) 246. The steps 241-246 may represent modules and/or blocks that may be implemented as hardware, software, a combination of hardware and software, or other implementations.

In each transport channel illustrated (e.g., TrCH 1, TrCH 2 and TrCH 3), the circuit 140 may perform a cyclic redundancy check attachment, transport block (TrBK) concatenation/code block segmentation, channel coding and rate matching in each of the transport channels in the step 241. In the step 242, the first DTX indicator insertion may take place in each of the transport channels. The initial interleave within each transport channel may occur in the step 243. In the step 244, the circuit 140 may perform the radio frame segmentation. Transport channel multiplexing of the individual transport channels into a single channel may be performed in the step 245. The subsequent interleave may occur in the step 246. After the subsequent interleave, each original set of DTX indicators may become a respective string of DTX indicators in the frame. The entries in the database 142 may point to the starting location and identify a length of a respective string.

The entries in the database 142 for the flexible mode may be built as follows:

S—may denote the number of bits from the transport channel multiplexing.

P—may denote the number of physical channels (e.g., PhCHs).

R—may denote the number of bits in a radio frame, including the data bits and the DTX indicators, for each PhCH.

TotalDTX—may denote the number of the total DTX indicators (bits).

P2(j)—may denote an original column position of the j-th permuted column.

The following notation may be used to further describe the database 142:

DB_NumOfDTX(ii)—may denote the number of DTX indicators in column ii after the subsequent interleave in a radio frame.

DB_StartIndex(kk,ii)—may denote the index of the start row of the DTX indicators in column ii after the subsequent interleave in a radio frame.

Figure 8:
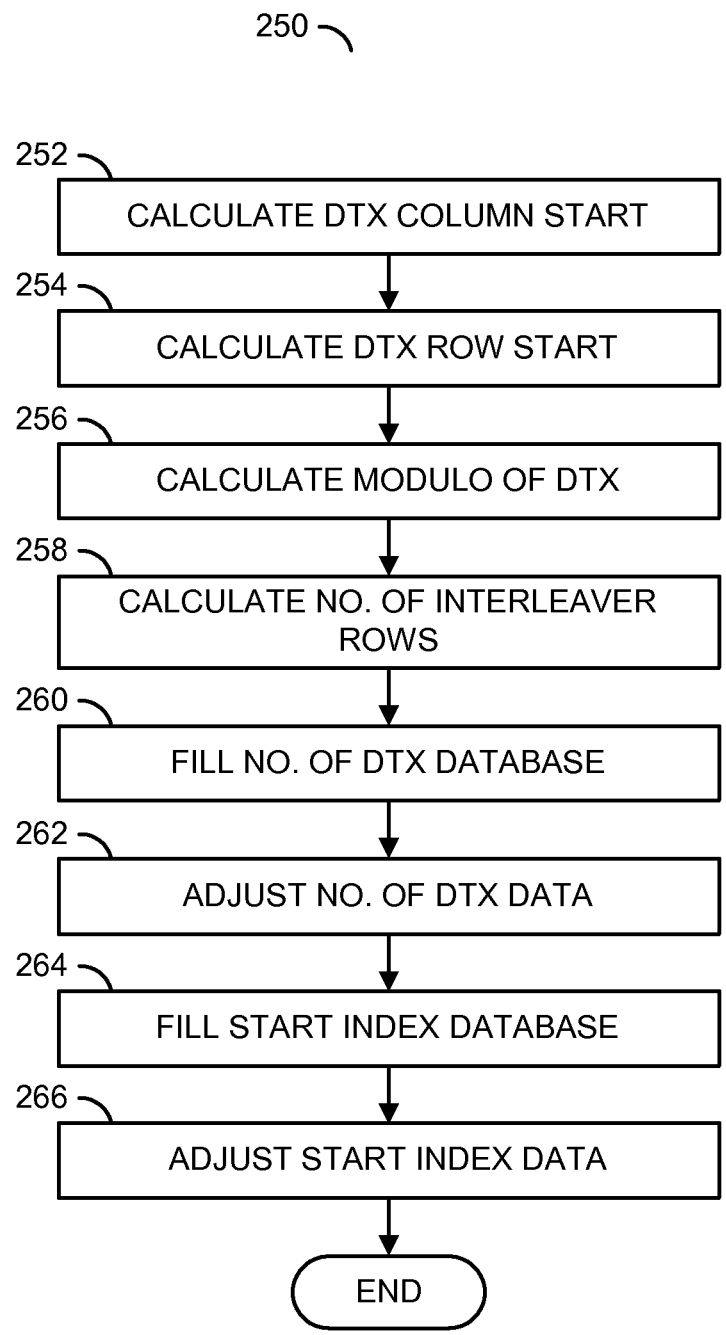
FIG. 8 is a flow diagram of an example method for adjusting the database for the subsequent interleave in a flexible mode.

Referring to FIG. 8, a flow diagram of an example method 250 for adjusting the database 142 for the subsequent interleave in the flexible mode is shown. The method (or process) 250 may be implemented by a combination of the circuit 140 and the database 142. The method 250 generally comprises a step (or state) 252, a step (or state) 254, a step (or state) 256, a step (or state) 258, a step (or state) 260, a step (or state) 262, a step (or state) 264 and a step (or state) 266. The steps 252-266 may represent modules and/or blocks that may be implemented as hardware, software, a combination of hardware and software, or other implementations.

The creation of the data base may be as follow. The value TotalDTX may be calculated by equation 5 as follows:

$$TotalDTX=(P \times R)-S. \quad (5)$$

The pattern P2 may be set to an initial pattern (e.g., [0, 20, 10, 5, 15, 25, 3, 13, 23, 8, 18, 28, 1, 11, 21, 6, 16, 26, 4, 14, 24, 19, 9, 29, 12, 2, 7, 22, 27, 17]). In the step 252, the circuit 140 may calculate the value DTXColumnStart as a ceiling of S/30. The value DTXRowStart may be calculated in the step 254 as a modulo operation mod(S,30). The value ModOfDTX may be calculated as a modulo operation mod(TotalDTX,30) in the step 256. In the step 258, the value NumOfInterleaverRows is generally calculated as a floor of TotalDTX/30. The values DB_NumOfDTX(P2(ii+1)+1) in the database may be filled with the value NumOfInterleaverRows in the step 260 for each ii from 0 to 29 (e.g., a value for each of the 30 columns of the subsequent interleave). In the step 262, the values DB_NumOfDTX may be adjusted by the circuit 140 to account for the subsequent interleave. The adjustment may be performed according to equation 6 as follows:

$$DB\_NumOfDTX(P2(ii+DTXRowStart+1)+1)=DB\_NumOfDTX(P2(ii+DTXRowStart+1)+1)+1, \text{ for } ii \text{ from 0 to ModOfDTX}-1. \quad (6)$$

In the step 264, the values DB_StartIndex(P2(ii+1)+1) may be filled with the value DTXColumnStart for ii from 0 to DTXRowStart−1. In the step 266, the values DB_StartIndex may be adjusted by the circuit 140 to account for the subsequent interleave. The adjustment may be performed according to equation 7 as follows:

$$DB\_StartIndex(P2(ii+1)+1)=DTXColumnStart-1, \text{ for } ii \text{ from DTXRowStart to 29.} \quad (7)$$

Figure 9:
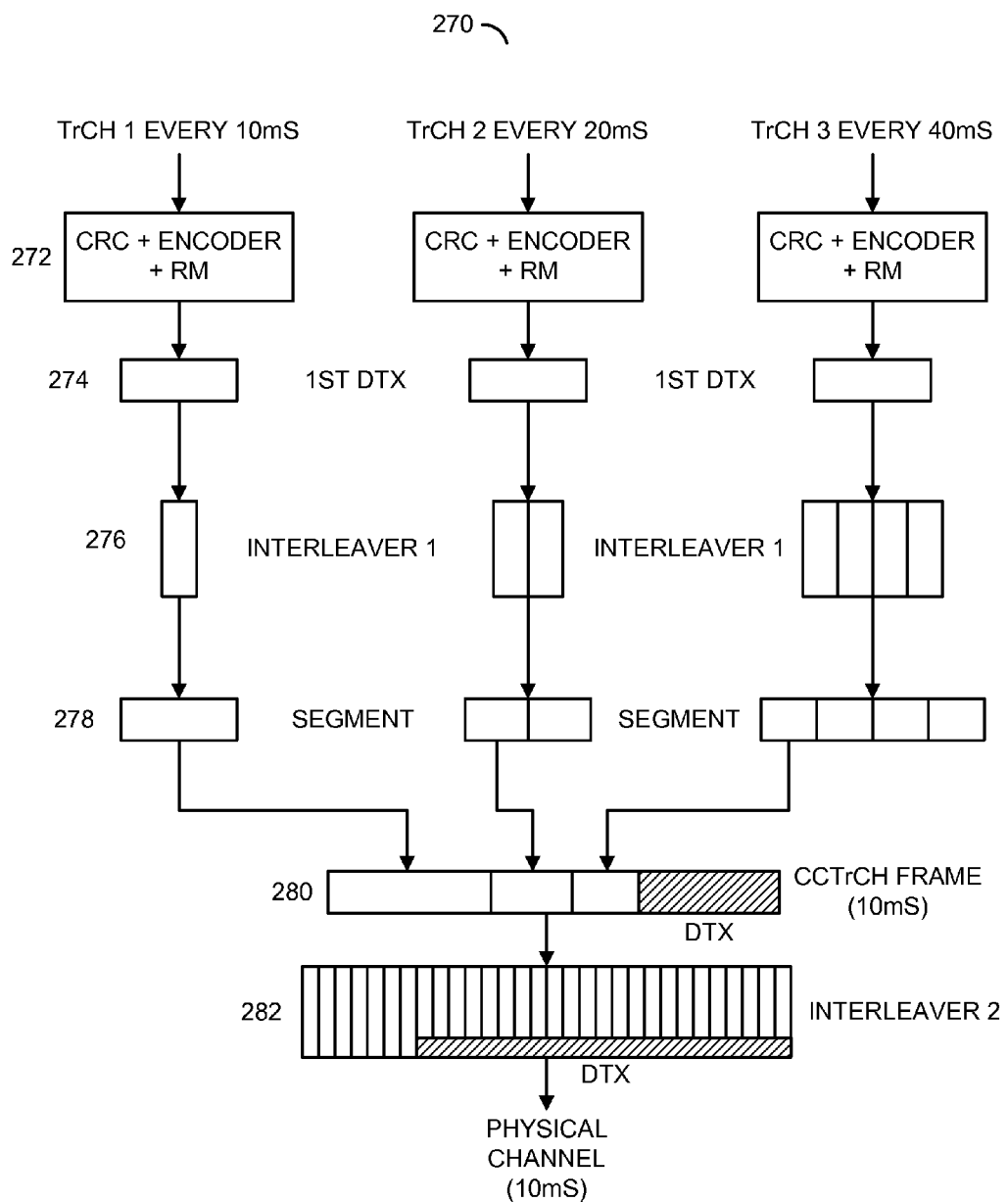
FIG. 9 is a diagram of an example method for multiplexing the three transport channels in the flexible mode.

Referring to FIG. 9, a diagram of an example method 270 for multiplexing three transport channels in the flexible mode is shown. The method (or process) 270 may be implemented by a combination of the circuit 140 and the database 142. The method 270 generally comprises a step (or state) 272, a step (or state) 274, a step (or state) 276, a step (or state) 278, a step (or state) 280 and a step (or state) 282. The steps 272-282 may represent modules and/or blocks that may be implemented as hardware, software, a combination of hardware and software, or other implementations.

In each transport channel illustrated (e.g., TrCH 1, TrCH 2 and TrCH 3), the circuit 140 may perform the cyclic redundancy check attachment, the transport block concatenation/code block segmentation, the channel coding and rate matching in each of the transport channels in the step 272. In the step 274, the first DTX indicator insertion generally does not take place. The initial interleave within each transport channel may occur in the step 276. In the step 278, the circuit 140 may perform the radio frame segmentation. Transport channel multiplexing of the individual transport channels into a single channel and the DTX insertion may be performed in the step 280. The subsequent interleave may occur in the step 282. After the subsequent interleave, the original set of DTX indicators may become a string of DTX indicators in the frame. The entries in the database 142 may point to the starting location and identify a length of the string.

Implementations of some embodiments of the present invention may cause the initial interleave and the subsequent interleave to operate on one-bit data items instead of two-or-more-bit data items. As such, the processing power used in processing the transport channels may be reduced compared with common approaches by having fewer bits to process. Furthermore, since the DTX indicators may have don't-care values, no actual work may be performed during the DTX insertions. Whatever random values that happen to be in the frame at the DTX insertion locations may left in place.

The functions performed by the diagrams of FIGS. 2-9 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products), monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMs (electronically programmable ROMs), EEPROMs (electronically erasable ROMs), UVPROM (ultra-violet erasable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, storage and/or playback devices, video recording, storage and/or playback devices, game platforms, peripherals and/or multi-chip modules. Those skilled in the relevant art(s) would understand that the elements of the invention may be implemented in other types of devices to meet the criteria of a particular application.

As would be apparent to those skilled in the relevant art(s), the signals illustrated in FIGS. 2-4 represent logical data flows. The logical data flows are generally representative of physical data transferred between the respective blocks by, for example, address, data, and control signals and/or busses. The system represented by the system 100 may be implemented in hardware, software or a combination of hardware and software according to the teachings of the present disclosure, as would be apparent to those skilled in the relevant art(s). As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the scope of the invention.

The invention claimed is:

1. An apparatus comprising:
a database configured to store a plurality of entries; and
a circuit configured to (i) insert a plurality of indicators into a frame, (ii) generate said entries in said database and (iii) transmit said frame in response to said entries such that power is applied to an antenna corresponding to each of a plurality of data items in said frame and no power is applied to said antenna corresponding to each of said indicators in said frame, wherein (a) each of said entries identifies a respective location in said frame, (b) each of said locations begins a respective string comprising at least one of said indicators, (c) said entries are different than said indicators and (d) each of said indicators is a discontinuous transmission symbol having at most a one-bit width.

2. The apparatus according to claim 1, wherein said transmit comprises a wideband code division multiple access transmission in a downlink from a base station to a mobile device.

3. The apparatus according to claim 1, wherein said discontinuous transmission symbols is compliant with a 3rd Generation Partnership Project technical specification 25.212 as modified to said one-bit width.

4. The apparatus according to claim 1, wherein each of said data items has at most a one-bit width after said indicators are inserted into said frame.

5. The apparatus according to claim 1, wherein (i) each of said entries comprises a respective start value and (ii) each of said start values identifies one of said respective locations in said frame.

6. The apparatus according to claim 5, wherein (i) each of said entries further comprises a respective size value and (ii) each of said size values identifies a respective number of said indicators in one of said respective strings.

7. The apparatus according to claim 1, wherein said circuit is further configure to interleave said data items and said indicators prior to said transmitting.

8. The apparatus according to claim 7, wherein said circuit is further configured to adjust said entries in said database to match said interleave.

9. The apparatus according to claim 1, wherein said apparatus is implemented as one or more integrated circuits.

10. A method for discontinuous transmission in a frame, comprising the steps of:
 (A) inserting a plurality of indicators into said frame;
 (B) generating a plurality of entries in a database, wherein (i) each of said entries identifies a respective location in said frame, (ii) each of said locations begins a respective string comprising at least one of said indicators, (iii) said entries are different than said indicators and (iv) each of said indicators is a discontinuous transmission symbol having at most a one-bit width; and
 (C) transmitting said frame in response to said entries such that power is applied to an antenna corresponding to each of a plurality of data items in said frame and no power is applied to said antenna corresponding to each of said indicators in said frame.

11. The method according to claim 10, wherein said transmitting comprises a wideband code division multiple access transmission in a downlink from a base station to a mobile device.

12. The method according to claim 10, wherein each of said discontinuous transmission symbols is compliant with a 3rd Generation Partnership Project technical specification 25.212 as modified to said one-bit width.

13. The method according to claim 10, wherein each of said data items has at most a one-bit width after said indicators are inserted into said frame.

14. The method according to claim 10, wherein (i) each of said entries comprises a respective start value and (ii) each of said start values identifies one of said respective locations in said frame.

15. The method according to claim 14, wherein (i) each of said entries further comprises a respective size value and (ii) each of said size values identifies a respective number of said indicators in one of said respective strings.

16. The method according to claim 10, further comprising the step of:
 interleaving said data items and said indicators prior to said transmitting.

17. The method according to claim 16, further comprising the step of:
 adjusting said entries in said database to match said interleaving.

18. An apparatus comprising:
 means for inserting a plurality of indicators into a frame;
 means for generating a plurality of entries in a database, wherein (i) each of said entries identifies a respective location in said frame, (ii) each of said locations begins a respective string comprising at least one of said indicators, (iii) said entries are different than said indicators and (iv) each of said indicators is a discontinuous transmission symbol having at most a one-bit width; and
 means for transmitting said frame in response to said entries such that power is applied to an antenna corresponding to each of a plurality of data items in said frame and no power is applied to said antenna corresponding to each of said indicators in said frame.

* * * * *